United States Patent Office 2,967,341
Patented Jan. 10, 1961

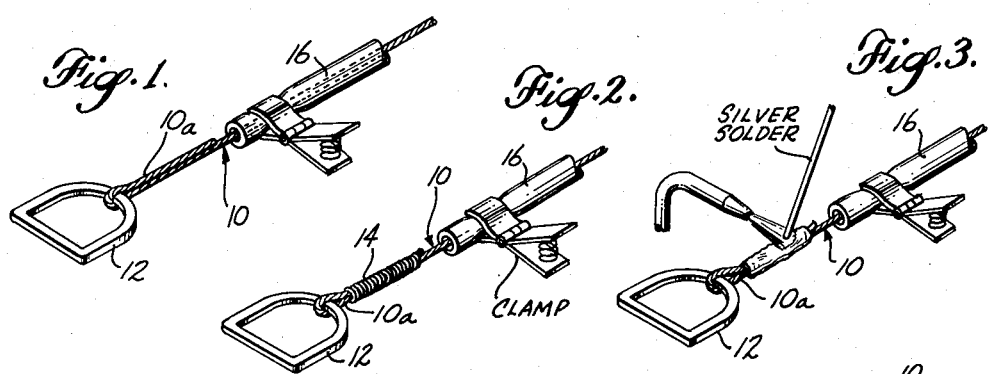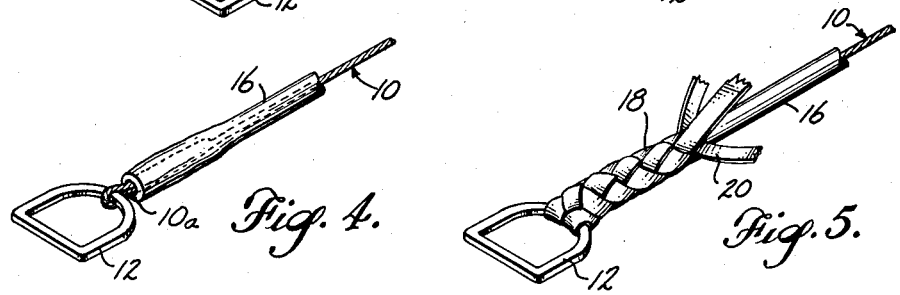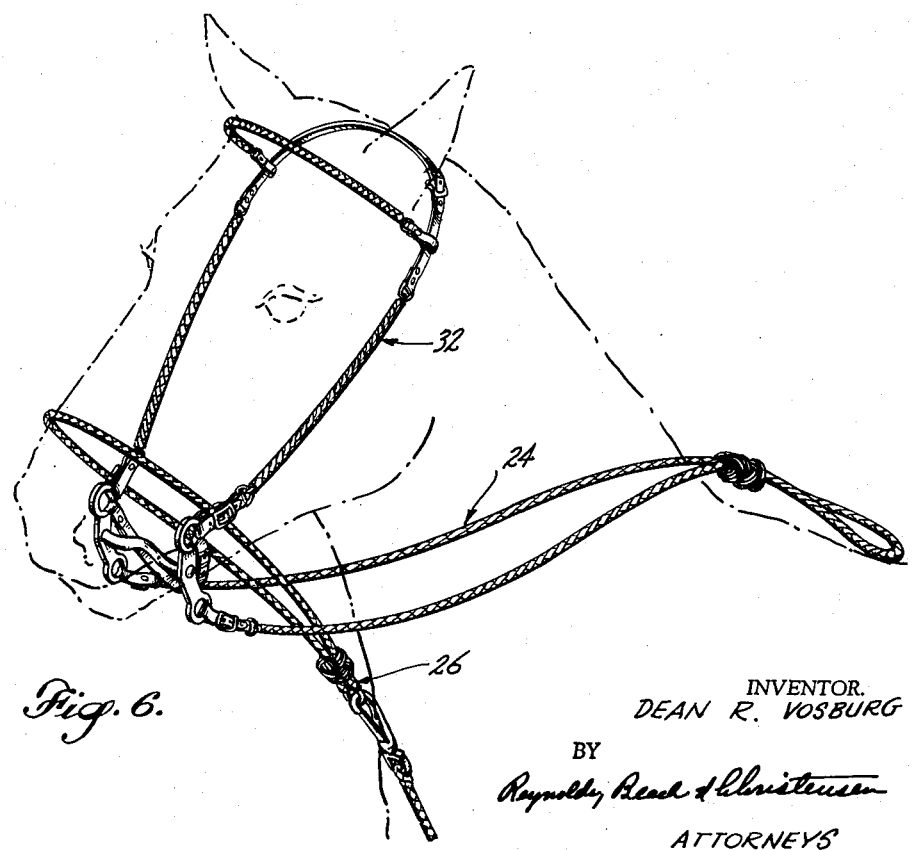

2,967,341

FLEXIBLE LINE ASSEMBLY

Dean R. Vosburg, 11915 Nyanza Road SW., Tacoma, Wash.

Filed Apr. 21, 1958, Ser. No. 729,999

4 Claims. (Cl. 24—123)

The invention relates to a novel line assembly which presents a decorative effect yet possesses certain desirable physical characteristics not usually attainable in combination therewith. The invention is herein illustratively described by reference to the presently preferred embodiment thereof as applied to the manufacture of animal tack or gear, particularly horse bridles. However, it will be evident that it has other applications and that certain modifications and changes therein with respect to details may be made without departing from the essential features involved.

Bridles and similar tack formed of hand-braided materials have long been employed to achieve certain decorative effects which are traditional and popular for circuses, fairs, parades, riding shows, animal exhibits, etc. However, there are certain practical problems with gear of this type made by ordinary methods. The usual braid materials, namely leathers, which possess the requisite strength and flexibility and can be ornamentally dyed are difficult to keep clean and free of discoloration because of the porous, absorptive characteristics of all leathers. Moreover, leather molds if stored long in a damp place and becomes stiff after drying, unless constantly oiled or otherwise treated. Non-porous, non-absorptive plastic materials, on the other hand, which are available in distinctive and attractive colors and which can be hand braided satisfactorily do not possess the requisite physical characteristics. If the plastic strands are very thick, as they would have to be for reasons of strength and to attain adequate cross section of the braided line for reasons of appearance, they become difficult to braid and the line becomes unduly stiff and inflexible, particularly at lower temperatures.

An object of this invention, therefore, is to provide a rugged, durable, easily cleaned and maintained tack line assembly which is at once exceedingly strong, yet pliant and tractable, and flexible, which presents the desired hand braiding effect traditional in animal show tack.

Still another object is a flexible, reinforced, braided line assembly which does not tend to twist or assume any distorted form due to inherent stresses therein.

These and other objects, together with the novel features and aspects of the invention will become more fully evident from the following description thereof by reference to the accompanying drawings.

Figure 1 to 5, inclusive, illustrate the steps of manufacturing the flexible, reinforced, braided line assembly, together with certain features of construction thereof.

Figure 6 illustrates a bridle in which the invention has been incorporated.

Referring to the drawings, the end portion 10a of a flexible multistrand steel or stainless steel cable 10 is looped around a connector 12 and doubled back upon itself. A stainless steel wire wrapping 14 is then applied tightly to the doubled cable, as shown in Figure 2. Thereupon, the wrapping is silver-soldered, brazed or otherwise bonded to the cable for strengthening the fastening, as shown in Figure 3. The silver-soldering operation heats the cable end and wrapping to a relatively high temperature. With the joint still at high temperature, the end of an elastic or rubber-like tube or sheath 16 is slipped snugly over it substantially to abutment with the connector. The heat within the wrapped cable portion melts the rubber surface in contact therewith, so that when the members cool the end of the rubber tube is strongly bonded to the wrapped cable end. The rubber tube 16 has an internal diameter which is preferably only slightly larger than the diameter of the multistrand cable 10, but because the fastening comprising the wrapped end portion of the cable is not bulky, the stretching of the tube over this wrapped joint only slightly enlarges the external diameter of the tube at the location of the joint.

The materials used may vary. Preferably the cable 10 comprises a plurality of twisted stainless steel strands of small diameter. In a typical case the cable is about one-sixteenth inch in diameter and is made up of forty-nine small strands, according to well known methods. Strong but flexible and pliant, the cable may be of any other suitable material having the requisite strength and flexibility and which preferably does not readily corrode.

The use of relatively soft rubber or a rubber-like material for the sheath or tube 16 has the advantage that it provides the desired bulk for the line and serves as a suitable base upon which to braid the relatively thin plastic cover 18 as in Figure 5. The braid material preferably comprises relatively thin, broad strands of a fabric-backed flexible plastic material 20. The braiding extends continuously from end to end of the line, with strands of the plastic material extending through the connector 12 to overlie and cover the loop of cable 10 passing therethrough as shown in Figure 5. The plastic material used may be of any suitable type and the strands may be of the same color or of different colors to form a pattern. Such materials are substantially impervious to moisture and skin oils and other substances with which they may come in contact and if they become soiled are readily cleaned by soap and water or other cleaning substances.

The use of a relatively soft rubber-like material for the sheath 10 permits the cable to be relatively flexible. Of greater bearing on flexibility, however, is the fact that the sheath 16 which surrounds the cable 10 is in non-bonded, slidable contact with the cable except at the ends where the sheath is bonded to the cable fastening as previously described. Thus, the core does not render the line inflexible nor is there any tendency for it to assume a bend or coil shape as would be the case in the event a plastic or rubber coated wire or cable were used as the core for the braided line, due to the natural coiling tendency of such a core. Consequently, the resulting bridle or other tack made up using one or more such lines is both pliant and tractable, as desired not only for the sake of appearance (i.e., the braid does not twist out of shape) but also for the comfort of a sensitive animal which might be irritated by an unduly stiff bridle. Should the line be twisted during use, resilience of the rubber tube restores it to its original straightness, since the ends of the tube are bonded to the cable ends and since the braiding is likewise secured anti-rotationally thereto through the respective end connectors.

In the manufacture of the line assembly, with an eye-like connector element at each end and with the cable fastened similarly to each such element, the elasticity of the sheath 16 again becomes of advantage because of the ease with which the sheath may be retracted and held, as by means of a clamp, in order to expose the looped end of the cable for purposes of wrapping and silver soldering, after the opposite end of the cable has already been secured to the opposing connector element. When the clamp is released after the silver soldering has been completed, the resilient elastic recoil of the sheath will cause it to resume its original length and slip over, with or without guidance, and become bonded to the heated end wrapping as desired.

In Figure 6 a completed bridle employing the invention to advantage is illustrated. In this case, the flexible reinforced braided line assembly principle is applied not only to the head stall 22 but also to the reins 24 and to the tie-down assembly 26. Such a bridle can be made very attractive and yet will possess the requisite strength, tractibility and flexibility, as well as being easily cleaned and maintained in its original attractive condition.

I claim as my invention:

1. A flexible reinforced line assembly comprising a connector having an eye-like element, a flexible cable having one end fastened to said eye-like element, an elastic sheath closely encircling said cable along the length thereof substantially to the eye-like element, said elastic sheath being in freely slidable contact with the cable over substantially the full length thereof substantially to the location of the fastened end, and a flexible cover comprising strands of relatively non-elastic material interwoven on said elastic sheath over the length thereof to the eye-like element, with strands of said cover extending through said eye-like element and arranged substantially to cover the end portion of the cable passing therethrough.

2. A decorative flexible reinforced braided line assembly comprising a connector having an eye-like element, a flexible cable having one end fastened to said eye-like element, an elastic sheath closely encircling said cable along the length thereof substantially to the eye-like element, the internal diameter of said elastic sheath being slightly larger than the cable and being in freely slidable contact therewith over substantially the full length thereof substantially to the location of the fastened end, and a flexible cover comprising strands of decorative plastic material braided on said elastic sheath over the length thereof to the eye-like element, with strands of said cover extending through said eye-like element and arranged substantially to cover the end portion of the cable passing therethrough.

3. A flexible reinforced line assembly comprising a connector having an eye-like element, a flexible cable having one end looped through said element and doubled back on itself and fastened to itself for a short distance along the cable adjacent to said element, a flexible sheath closely encircling said cable along the length thereof and having an end portion extending over and bonded to the doubled portion of the cable substantially to the eye-like element, the sheath over the remainder of its length substantially to its opposite end being in unbonded freely slidable contact with the cable, and a decorative cover applied to said flexible sheath extending through said eye-like element and arranged substantially to cover the end portion of the cable passing therethrough.

4. A flexible reinforced braided line assembly comprising two connectors each having an eye-like element, a flexible cable having its opposite ends fastened respectively to said eye-like elements to form terminal connections, an elastic sheath closely encircling said cable along the length thereof substantially to the eye-like elements and bonded to said terminal connections, the internal diameter of said elastic sheath being slightly larger than the cable and being in freely slidable contact with the cable over substantially the entire length thereof between said terminal connections, and a cover comprising strands of relatively non-elastic material braided on said elastic sheath over the length thereof to the eye-like elements, with strands of said cover extending through said eye-like elements and arranged substantially to cover the end portions of the cable passing therethrough.

References Cited in the file of this patent

UNITED STATES PATENTS

| | | |
|---|---|---|
| 325,653 | Bunnell | Sept. 8, 1885 |
| 1,738,107 | Luftig | Dec. 3, 1929 |
| 2,057,881 | Creamer | Oct. 20, 1936 |
| 2,242,533 | Meighan | May 20, 1941 |
| 2,284,042 | Clark | May 26, 1942 |
| 2,288,918 | Parker | July 7, 1942 |
| 2,289,512 | McKenney et al. | July 14, 1942 |
| 2,532,135 | Whyland | Nov. 28, 1950 |
| 2,573,055 | Pedersen | Oct. 30, 1951 |
| 2,623,340 | Rudolph | Dec. 30, 1952 |
| 2,652,671 | Griffiths | Sept. 22, 1953 |
| 2,798,458 | Odermatt | July 9, 1957 |
| 2,808,642 | Fons et al. | Oct. 8, 1957 |
| 2,809,142 | Beeber et al. | Oct. 8, 1957 |

FOREIGN PATENTS

| | | |
|---|---|---|
| 161,388 | Great Britain | Apr. 14, 1921 |
| 415,435 | Italy | Oct. 14, 1946 |